United States Patent
Skrzypczak et al.

(10) Patent No.: US 9,940,360 B2
(45) Date of Patent: Apr. 10, 2018

(54) STREAMING OPTIMIZED DATA PROCESSING

(71) Applicant: SAP SE, Walldorf (DE)

(72) Inventors: Joseph Michael Skrzypczak, Kitchener (CA); Kyle Dohring, Kitchener (CA); Palaniappan Gandhi, Chicago, IL (US); Shubhra Biswas, Chicago, IL (US)

(73) Assignee: SYBASE, INC., Dublin, CA (US)

( * ) Notice: Subject to any disclaimer, the term of this patent is extended or adjusted under 35 U.S.C. 154(b) by 345 days.

(21) Appl. No.: 14/715,965

(22) Filed: May 19, 2015

(65) Prior Publication Data

US 2016/0342658 A1    Nov. 24, 2016

(51) Int. Cl.
*G06F 17/30* (2006.01)

(52) U.S. Cl.
CPC .............................. *G06F 17/30516* (2013.01)

(58) Field of Classification Search
CPC ................................................. G06F 17/30516
See application file for complete search history.

(56) References Cited

U.S. PATENT DOCUMENTS

| | | | | |
|---|---|---|---|---|
| 7,680,998 B1* | 3/2010 | Auchmoody | ..... | G06F 17/30191 707/648 |
| 7,752,326 B2* | 7/2010 | Smit | ..... | G06F 17/2288 709/203 |
| 9,292,574 B2* | 3/2016 | Hsiao | ..... | G06F 17/30442 |
| 2004/0236726 A1* | 11/2004 | Ewing | ..... | G06F 17/3048 |
| 2007/0198580 A1* | 8/2007 | Savinov | ..... | G06F 9/443 |
| 2008/0222273 A1* | 9/2008 | Lakshmanan | ..... | G06F 17/30247 709/219 |
| 2008/0243675 A1* | 10/2008 | Parsons | ..... | G06Q 40/00 705/37 |
| 2010/0217995 A1* | 8/2010 | Enoki | ..... | G06F 17/3048 713/178 |
| 2012/0331019 A1* | 12/2012 | Schreter | ..... | G06F 12/123 707/813 |

OTHER PUBLICATIONS

Mehdi Khalili, "ORM anti-patterns—Part 3: Lazy loading", http://www.mehdi-khalili.com/orm-anti-patterns-part-3-lazy-loading, Dec. 31, 2010.*

* cited by examiner

*Primary Examiner* — Jay A Morrison
(74) *Attorney, Agent, or Firm* — Sterne, Kessler, Goldstein & Fox P.L.L.C.

(57) ABSTRACT

Disclosed herein are system, method, and computer program product embodiments for stream optimized data processing. An embodiment operates by receive a stream of data in a streaming data format. A query associated both with the stream of data and one or more records of a database is determined. It is determined whether the one or more records of the database are stored in a local cache. Those records not stored in the local cache are retrieved from the database and converted into the streaming data format. A query response, including references to each of the one or more records stored in the local cache in the streaming data format, is provided for execution of the query.

20 Claims, 3 Drawing Sheets

STREAMING OPTIMIZED DATA PROCESSING

BACKGROUND

When data is needed from a database, a call must be made to the database from the system requiring the information. This retrieval of data from the database creates latency between the time the request is received and the time the data is received. For systems that use streaming information as well as database information, this latency may create an unacceptable delay in query processing.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for streaming optimized data processing.

Figure 1:
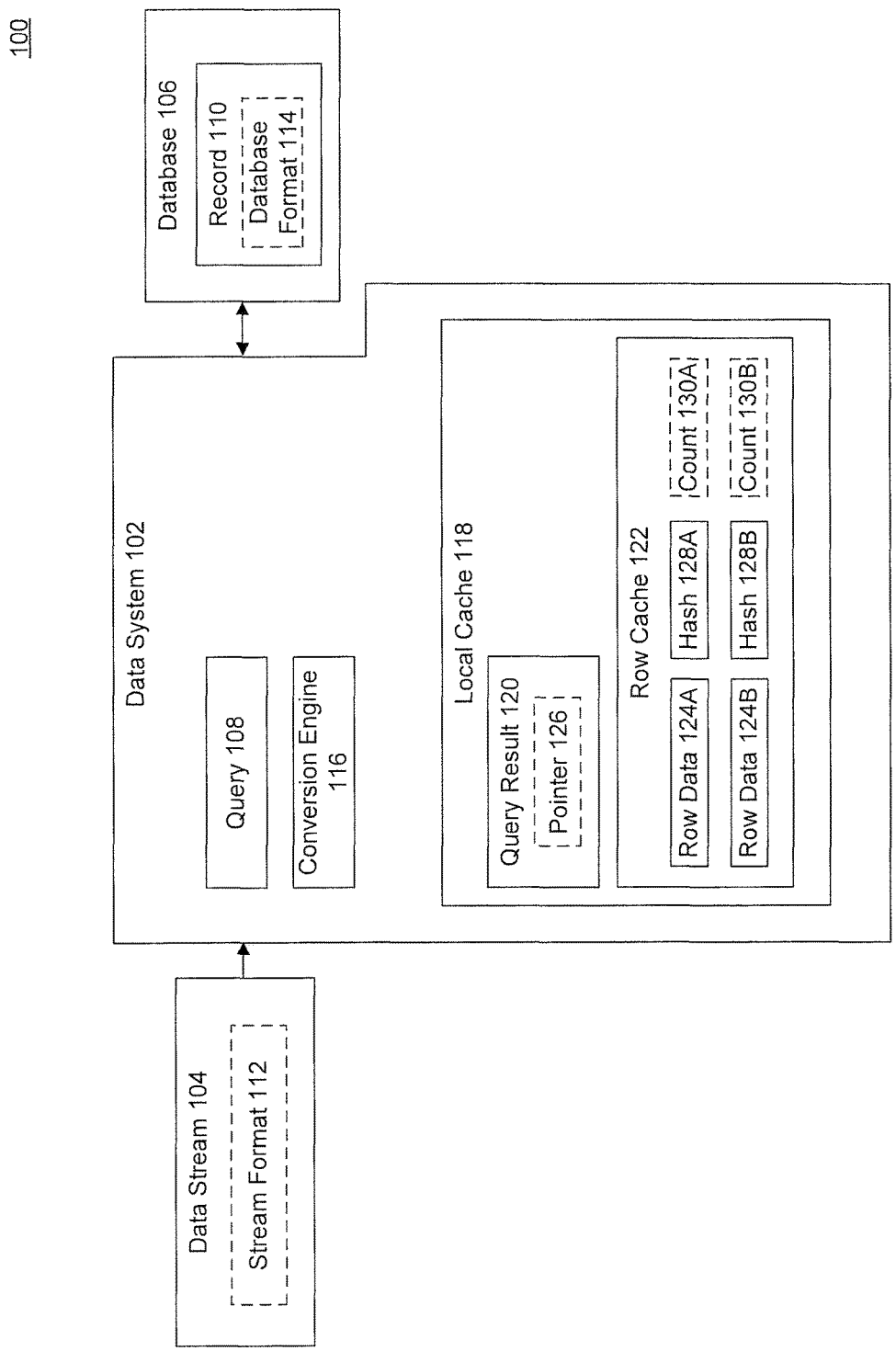
FIG. 1 is a block diagram of a database system for streaming optimized data processing, according to an example embodiment.

FIG. 1 is a block diagram 100 of a database system 102 for streaming optimized data processing, according to an example embodiment. As used herein, the term "optimized" (and similar terms) may encompass optimal as well as sub-optimal solutions, as measured against any predetermined or agreed upon benchmark. Data system 102 receives data from a data stream 104, retrieves data from a database 106 that may be necessary to process one or more queries 108, joins the data, and processes the queries 108, or otherwise provides the joined data for query 108 processing. In an embodiment, the query processing by data system 102 is optimized for a system that receives streaming data 104.

Data stream 104 may be a stream or streaming data received from users or systems. For example, data stream 104 may include data from online retailers processing sales or other transactions. Data stream 104 may include live data received in real-time for processing with regard to one or more queries 108. Data system 102 may receive and/or process multiple data streams 104 simultaneously or otherwise in parallel from various sources.

Database 106 may be any storage structure used to store data. Database 106 may be a disk-based, persistent storage structure. Database 106 may be either a column-oriented or row-oriented database storing one or more records 110 across one or more tables. A record 110 may be a grouping or set of data that is logically related, such as a row, column, table, or set of tables. For example, record 110 may include data about a particular customer, such as address, nationality, purchase history, income, and account balance. Or, for example, record 110 may include data about a particular category of data across one or more customers, such as the languages spoken by the various customers of the system, or favorite sports teams.

In an embodiment, some or all data from database 106 may be related to or otherwise associated with data from data stream 104. For example, data stream 104 may include data from a recent customer transaction on a website, while database 106 includes past transaction data related to the product/service being purchased and/or the customer who purchased the product/service.

Query 108 may be a transaction that uses both data from data stream 104 and database 106 to perform a transaction or arrive at a result. In continuing the example above, if data from data stream 104 indicates that customer A is purchasing product X, query 108 may need to identify when was the last time customer A purchased product X, which may be stored in database 106. Each time data is received from data stream 104, that data may be compared against one or more queries 108 to determine which data needs to be retrieved from database 106 in order to process or execute those queries 108. Query 108 may be a read-only transaction or a write transaction that modifies data (and writes the modified data to database 106).

Data of data stream 104 may be stored in a stream format 112, while data of database 106 may be stored in a database format 114. Stream format 112 may be a format of how the data of data stream 104 is received, while database format 114 may be a format of how the data of database 106 is stored. As noted above, stream format 112 may be a particular format of data optimized for streaming (e.g., network transmission), and may be optimized relative to database format 114. In an embodiment, stream format 112 and database format 114 may vary in how different data types are represented and/or stored in the different format types. Further details on the differences between stream format 112 and database format 114 are provided below.

In an embodiment, a conversion engine 116 may convert the data from data stream 104 and/or the data from database 106 so that they may be used together to efficiently process query 108. Conversion engine 116 may change an internal representation of how data from database 106 is stored in a local cache 118 so the data may be more efficiently used with streaming data 104. For example, conversion engine 116 may convert the records 110 in database format 114 into stream format 112 (or a format similar to stream format 112).

In an embodiment, database format 114 may be a standard database format, such as Java Database Connectivity (JDBC) or Open Database Connectivity (ODBC). JDBC and ODBC may be standard database APIs (application programming interfaces) that allow data system 102 to retrieve or otherwise receive data (e.g., records 110) from database 106. The API may provide the requested data or records 110 from database in a standardized format. There may be a cost or latency associated with each call to an API. In an embodiment, it may be known how each API represents a date and/or time associated with a record 110. For example, a date value in a first API may be represented as YYYY-MM-DD, while a date value in a second API may be MM-DD-YYYY.

Stream format 112 may be a format for data that optimized for streaming. Similar to database format 114, stream format 112 may have its own way of representing different data types. For example, rather than representing a date in MM-DD-YYYY format as may be done by database format 114, stream format may represent a date in the number of days (or other time interval) from a point of reference date, such as the number of days since Jan. 1, 1970. Transmitting the date information in the exemplary stream format 112 may, for example, provide for faster streaming of date information (e.g., relative to transmitting the date information in database format 114). In other embodiments, date information may be represented in different ways in database format 114 and/or stream format 112. Other data types may have additional differences between how data is represented or stored in database format 114 relative to stream format 112.

In an embodiment, to process query 108, or more efficiently process query 108, the differences in the data formats 112 and 114 may need to be addressed. For example, conversion engine 116 may perform a conversion to address the differences in the formats 112 and 114. In an embodiment, conversion engine 116 may convert record 110 data from database format 114 into stream format 112. In an embodiment, there may be some overlap between database format 114 and stream format 112 such that not all fields of data from a record 110 need to be converted into stream format 112.

In an embodiment, data system 102 may include multiple conversion engines 116 to address different type of stream formats 112 and/or database formats 114. For example, data system 102 may receive multiple data streams 104, each with its own unique stream format 112. Then for example, data system 102 may include multiple conversion engines 116, each one dedicated to handling or converting database 106 data into the varying stream formats 112.

In an embodiment, data that has been converted from database format 114 into stream format 112 may be stored in a local cache 118. Local cache 118 may be a block or portion of memory used to store data. In an embodiment, local cache 118 may be non-persistent memory. Local cache 118 may store frequently used data and reduce the time needed by data system 102 to access data from database 106.

Local cache 118 may include both query results 120 and a row cache 122. Row cache 122 may be where converted data from database 106 is stored. Query result 120 may include the result of or the data to be used to process query 108. Row cache may be optimized to minimize memory consumption by storing each record 110 retrieved from database 106 only once, even if it is simultaneously or in parallel being used across multiple and/or varying queries 108.

In an embodiment, data retrieved from database 106 may be retrieved in a row format, even if database 106 is column-oriented. This may be the result of the API used to access records 110 of database 106, which may normalize all data into row-oriented data. This row-oriented record data 110 may be converted into stream format 112 and stored as row data 124.

In an embodiment, query result 120 may then include a pointer 126 to the row data 124A-B that is part of query result 120. Pointer 126 may be a pointer, address, or other reference to one or more rows of data 124. In an embodiment, query result 120 may include a separate pointer 126 for each row 124 that is part of the query result 120.

In an embodiment, query result 120 may include both data from data stream 104 and database 106. Data system 102 may perform a join or other combination operation to provide access to both streaming data 104 and database 106 data. For example, if data stream 104 includes recent purchase information of customer X, and row data 124A includes purchase history information of customer X, query result 120 may include pointers 126 and/or data from both data stream 104 and database 106 for query 108 processing.

In an embodiment, row data 124 may be stored in row cache 122 to speed up query 108 processing by data system 102. For example, storing row data 124 in row cache 122 may prevent data system 102 from needing to retrieve the record(s) 110 corresponding to database 106 and perform another conversion on the retrieved data into stream format 112 when the data is requested by a subsequent query 108. However, in an embodiment, to minimize the memory used by row cache 122 and/or local cache 118, each set of row data 124 may be stored only once in row cache 122 and may be garbage collected or otherwise removed or discarded when no longer necessary.

In an embodiment, when stream data 104 is received and query 108 is to be processed, a data system 102 may determine which data from database 106 is necessary to process query 108. Data system 102 may receive a data, such as one or more primary keys, corresponding to the records 110 from database 106 associated with the query 108. In an embodiment, data system 102 may hash the received primary keys and compare the primary key hash(es) to hashes 128 corresponding to the cached row 124 (e.g., primary key data corresponding to the cached row 124). Hash 128 may be a hash value of a portion of the data retrieved from database 106, such as the primary key.

By comparing stored hashes 128 to hashes of primary key data from database 106 corresponding to the records 110 or data necessary to process query 108, data system 102 may determine which rows, records 110, or other data needs to be retrieved from database 106. For example, data system 102 may compare the hashes of the received data to hashes 128 and determine that the hashes of the received data that correspond to a cached hash 128 do not need to be re-retrieved from database 106. Data system 102 may then retrieve the data (or remaining data) corresponding to the remaining hashes of the received data (e.g., that do not correspond to a cached hash 128) and convert and store the data in row cache 122 as row data 124, as described above.

In an embodiment, the hash comparison may enable data system 102 to determine that data of database 106 corresponding to a particular row had been updated between the time when row data 124 was retrieved and when query 108 is determined to be processed. For example, row data 124A may correspond to Row 2 of Table 3 in database 106 and may have a hash value 128A of X. Query 108 may also use the data from Row 2 of Table 3, and may receive a hash value of X1 from database 106. Then, for example, based on the hash comparison, data system 102 may determine that the data of Row 2, Table 3 has been updated then the updated Row 2, Table 3 data may be retrieved and converted, and the old row data of hash value X may be discarded or removed from row cache 122.

After the updated and/or new row data is retrieved from database 106, converted, and stored in row cache 122, a query result 120 may be assembled. Query result 120 may include pointers 126 to both the existing and newly retrieved/converted row data 124 corresponding to the query 108 request. Using query result 120, data system 102 may then process query 120. If the result of query processing is that new data is to be written to database 106, the result of the query processing may be written using one or more known database adapters.

In an embodiment, data system 102 may maintain a count 130 for each row of data 124 stored in row cache 122. Count 130 may be a tracked number of how many queries 108 are accessing a particular data row 124. In an embodiment, when count 130 drops to zero, the corresponding row data 124 may be removed, deleted, or otherwise marked for garbage collection form row cache 122. This may conserve memory in local cache 118.

In an embodiment, row cache 122 may maintain a timestamp or age of each data row 124 and/or query result 120. Then, for example, when the age of a particular data set exceeds a particular threshold or maximum age, the data set may be marked for garbage collection or otherwise removed from local cache 118 (including row cache 122). In an embodiment, a query 108 may have a particular expiration period or threshold at the end of which query result 120 may be marked for deletion. However, if a query result 120 is marked for deletion from local cache 118, its corresponding row data 124 may remain in row cache 122 and may be used with other queries 108 and/or query results 120.

Figure 2:
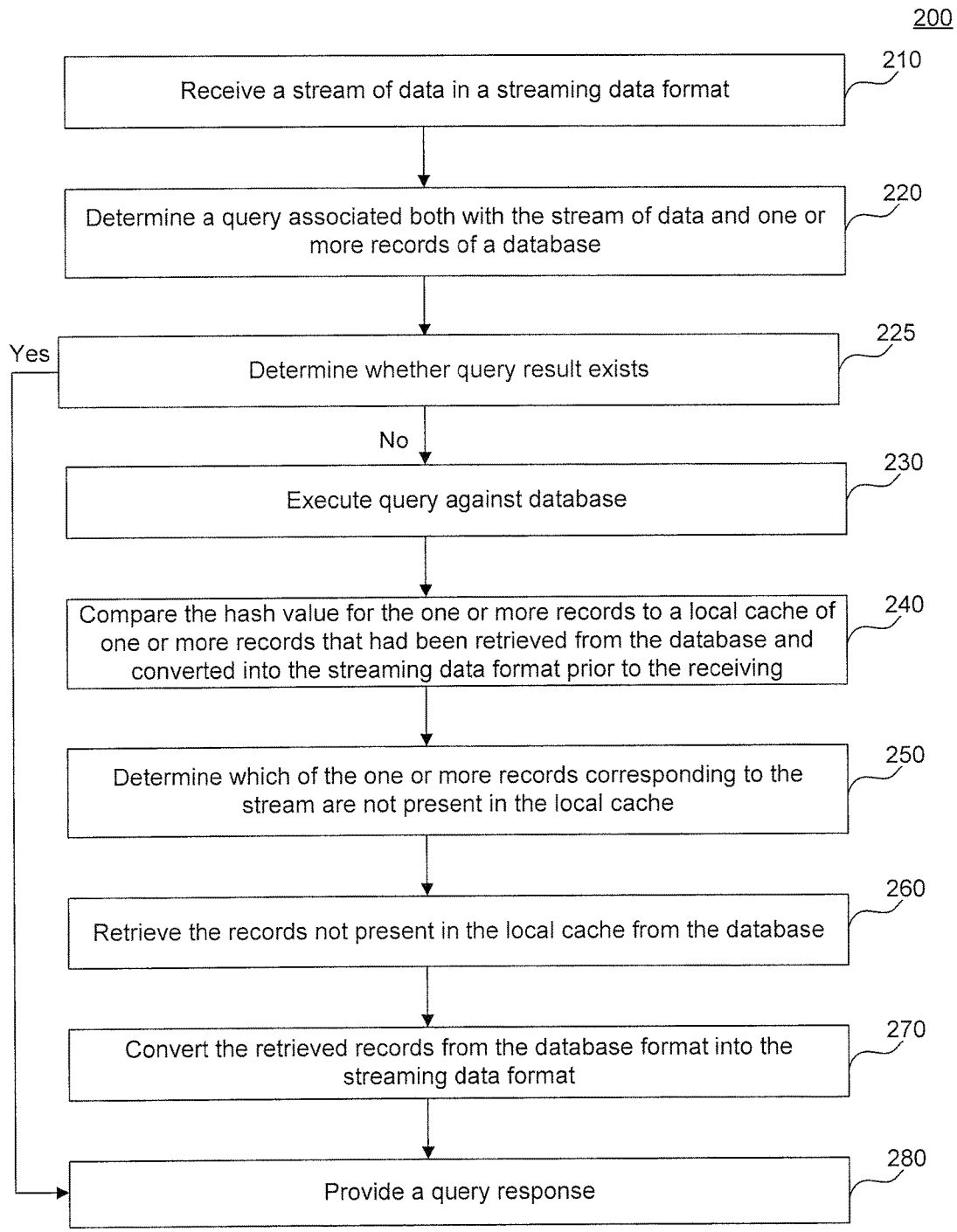
FIG. 2 is a flowchart illustrating a process for streaming optimized data processing, according to an example embodiment.

FIG. 2 is a flowchart illustrating a process 200 for streaming optimized data processing, according to an example embodiment. Method 200 can be performed by processing logic that can comprise hardware (e.g., circuitry, dedicated logic, programmable logic, microcode, etc.), software (e.g., instructions run on a processing device), or a combination thereof.

In step 210, a stream of data is received in a streaming data format. For example, data system 102 may receive data stream 104. The data of data stream 104 may be organized or formatted into stream format 112. Stream format 112 may be a format for data that is optimized for streaming.

In step 220, a query associated with both the stream of data and one or more records of a database is determined. For example, data system 102 may determine, generate, or receive query 108. Query 108 may be associated with both data from data stream 104 and data from database 106. In an embodiment, data system 102 may receive or identify multiple queries 108 at system start-up.

In step 225 it is determined whether the query already has an existing result in the local cache 220. For example, data system 102 may determine whether a query result 120 for query 108 already exists in local cache 118, and whether or not the query result 120 has expired. If the query result 120 exists in local cache 118 and has not expired, query result 120 may be provided in response to query 108 as indicated by step 280.

In an embodiment, hashing happens after query execution or retrieval from the database 106 to determine whether there is any overlap between this query 108 and other queries in the data system 102 as far as the unique database rows 110 being returned. Including, for example, returning a correct/consistent query result 120 even if rows 110 are being modified in the database 106 while queries 108 on those rows 110 are being executed. Two queries 108 might return row 1, the first query 108 will see a copy of row 1 based on the way it looked when the physical database 106 query executed. A second query 108 may then executed but the value in row 1 may have been modified since the execution of the first query 108. A second copy of that row 110 may then be stored in local cache 116, so that the second query result 120 is consistent with the data of database 106 when the query was received or executed. If there was no change in row 1, a single copy of the row would be stored in local cache 118.

In step 230, the query is executed against the database. For example, the primary keys of records corresponding to the query 108 may be retrieved from the database 106. Then, for example, data system 102 may determine a hash value for the retrieved database data.

In step 240, the hash value for the one or more records is compared to a local cache of one or more records that had been retrieved from the database and converted into the streaming data format prior to the receiving. For example, local cache 118 may include a row cache 122 that includes row data 124 of data that was previously retrieved from database 106 and converted into stream format 112. In an embodiment, the data of row cache 122 may be dynamically built in real-time (e.g., responsive to receiving streaming data 104) and/or may be pre-populated with row data 124 prior to query 108 (e.g., at system start-up).

In step 250, it may be determined which of the one or more records corresponding to the stream are not present in the local cache. For example, data system 102 may compare the hash values of records 110 to the hashes 128 of row data 124 to determine which records 110 of database 106 are already stored in local cache 118. In the examples described, hash values may be used in steps 230-250 to determine which records 110 exist in local cache 118 and which ones need to retrieved from database 106. However it should be understood that there may be other ways by which a system may perform this determination (with or without the use of hash values) without deviating from the scope of the invention.

In step 260, the records not present in the local cache are retrieved from the database. For example, data system 102 may request or get those records 110 from database 106 who hash values do not match an existing hash 128 from local cache 118.

In step 270, the retrieved records from the database format are converted into the streaming data format. For example, conversion engine 116 may convert the retrieved records 110 from database format 114 into stream format 112. In an embodiment, only select fields of record 110 may be converted. It may be, for example, that there are one or more fields of data that are similarly represented in both stream format 112 and database format 114, and one or more fields that are represented differently (e.g., optimized for streaming in stream format 112). In an embodiment, when the converted row data 124 is stored in row cache 122, the data may be stripped of data type identifiers (e.g., which may have been present in database format 114 prior to conversion by conversion engine 116).

In step 280, a query response is provided. For example, the query result 120 may include pointer 126 that references the records of database 106 that were converted into the stream data format 112 and stored in the row cache 122. In an embodiment, query result 120 may include pointer 126 that may be a reference to multiple rows of data 124, or may be a reference to a single row of data 124. For example, pointer 126 may be a memory address that corresponds to the row data 124. Data system 102 (or another system) may then execute query 108 using the referenced row data 124 stored from row cache 122 as referenced by query result 120.

Figure 3:
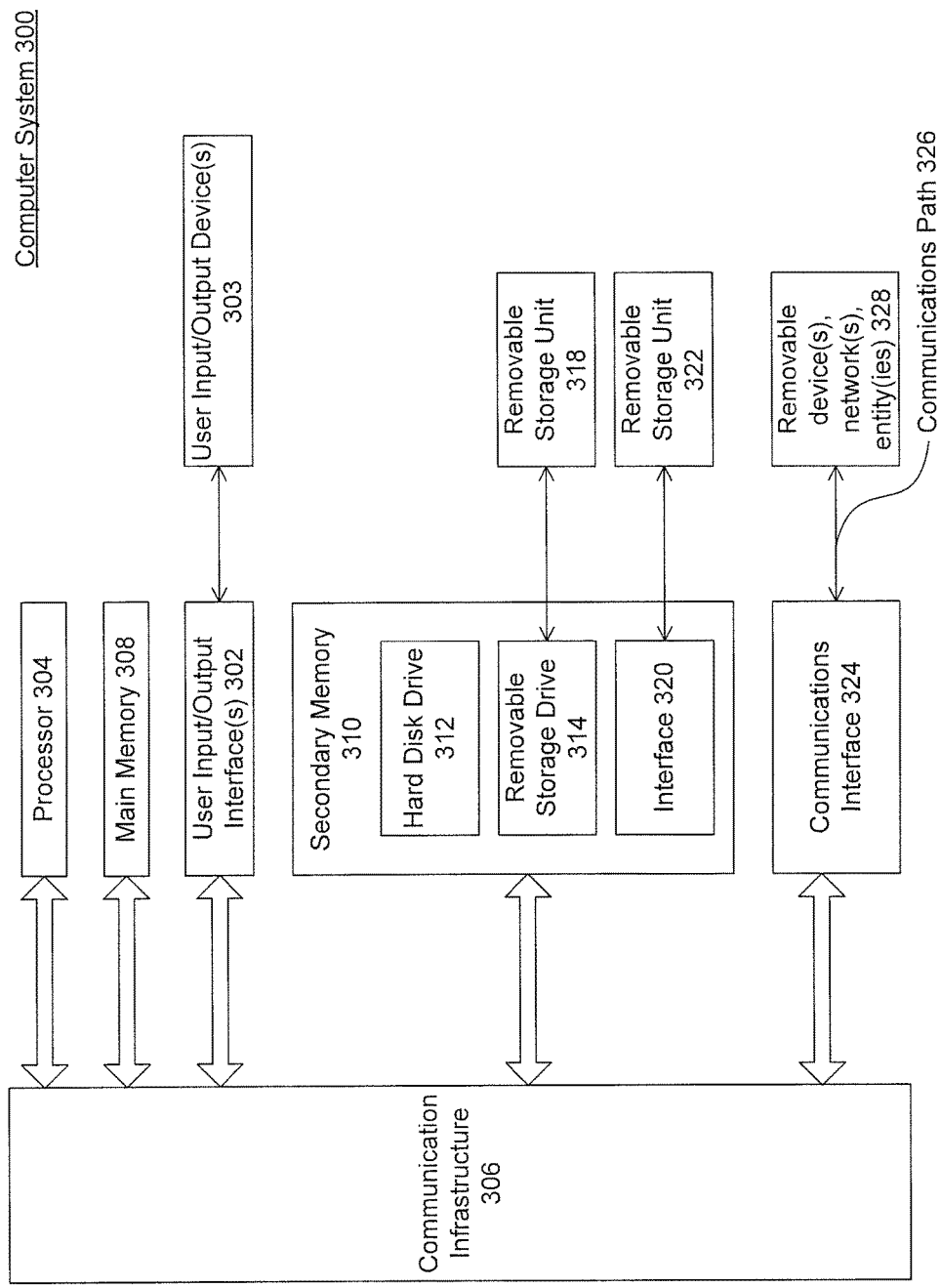
FIG. 3 is an example computer system useful for implementing various embodiments.

Various embodiments can be implemented, for example, using one or more well-known computer systems, such as computer system 300 shown in FIG. 3. Computer system 300 can be any well-known computer capable of performing the functions described herein.

Computer system 300 includes one or more processors (also called central processing units, or CPUs), such as a processor 304. Processor 304 is connected to a communication infrastructure or bus 306.

One or more processors 304 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 also includes user input/output device(s) 303, such as monitors, keyboards, pointing devices, etc., that communicate with communication infrastructure 306 through user input/output interface(s) 302.

Computer system 300 also includes a main or primary memory 308, such as random access memory (RAM). Main memory 308 may include one or more levels of cache. Main memory 308 has stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 includes a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 reads from and/or writes to removable storage unit 318 in a well-known manner.

According to an exemplary embodiment, secondary memory 310 may include other means, instrumentalities or other approaches for allowing computer programs and/or other instructions and/or data to be accessed by computer system 300. Such means, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 enables computer system 300 to communicate and interact with any combination of remote devices, remote networks, remote entities, etc. (individually and collectively referenced by reference number 328). For example, communication interface 324 may allow computer system 300 to communicate with remote devices 328 over communications path 326, which may be wired and/or wireless, and which may include any combination of LANs, WANs, the Internet, etc. Control logic and/or data may be transmitted to and from computer system 300 via communication path 326.

In an embodiment, a tangible apparatus or article of manufacture comprising a tangible computer useable or readable medium having control logic (software) stored thereon is also referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 3. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method, comprising:
 receiving a plurality of streams of data, wherein each stream of data has its own stream data format;
 determining a query associated both with a first one of the plurality of streams of data and one or more records of a database stored in a database format;
 determining whether the one or more records are stored in a local cache, the local cache comprising one or more records that had been retrieved from the database and converted into the streaming data format of the first stream prior to the receiving;

retrieving, from the database, any records of the database associated with the query and not already stored in the local cache;

converting the retrieved records from the database format into the streaming data format of the first stream, wherein the converting changes an internal representation of how the records retrieved from the database are stored in a local cache, wherein the converted records are stored in the local cache in the streaming data format, wherein the query is executed against both the first stream of data and the converted records as stored in the cache; and providing a query response for an execution of the query, wherein the query response comprises references to the records of the database stored in the local cache in the streaming data format and that are associated with the query, wherein at least one of the receiving, determining a query retrieving, converting, and providing are performed by one or more computers in parallel on both the first stream and a second one of the plurality of streams.

2. The method of claim 1, further comprising: executing the query.

3. The method of claim 1, wherein the converting comprises removing data type information from the retrieved records in the database format.

4. The method of claim 1, wherein the determining whether the one or more records of the data are stored in a local cache comprises:

determining that a particular record of the database associated with the query is stored in the local cache;

determining whether a hash value of the particular record as stored in the local cache is different from a hash value for the particular record as stored in the database; and removing the particular record from the local cache based on the determination of whether hash values are different, wherein the retrieving comprises retrieving the particular record from the database.

5. The method of claim 1, further comprising:

tracking how many queries are accessing a particular record of the local cache; and removing the particular record from the local cache if it is determined that the particular record is not being accessed by any queries.

6. The method of claim 1, wherein the determining whether the one or more records of the data are stored in a local cache comprises:

executing the query against the database;

determining a database hash value for the records of the database associated with the query based on the executing;

determining a local cache hash value for the one or more records of the local cache; and comparing the local cache hash values to the database hash values, wherein the retrieving comprises retrieving database records for any database hash value that does not have a corresponding local cache hash value.

7. The method of claim 1, wherein the comparing comprises:

determining whether a particular query response exceeds a maximum age; and removing the query response from the local cache if the maximum age is exceeded.

8. The method of claim 1, wherein a plurality of queries simultaneously access one or more records of the local cache, wherein a first one of the plurality of queries is associated with a record of the database not associated with a second of the queries.

9. The method of claim 1, wherein the comparing comprises:

comparing the hash value for the one or more records to hash values corresponding to the one or more records that had been retrieved from the database, converted into the streaming data format, and stored in the local cache prior to the receiving.

10. The method of claim 1, further comprising:

determining a count of a plurality of queries executed against both the stream of data and the converted records from the database is maintained as stored in a cache; and removing the converted records from the cache when the count is equal to zero.

11. The method of claim 1, wherein data in the streaming format is transmitted faster compared to similar data in the database format.

12. The method of claim 1, wherein at least one field of the streaming format overlaps with at least one field of the database format, and wherein at least one field of the database format is converted to at least one field of the streaming format.

13. The method of claim 1, wherein the database is column-oriented, and wherein the data is converted and stored in the cache in a row-oriented format.

14. A system, comprising:

a memory; and at least one processor coupled to the memory and configured to:

receive a plurality of streams of data, wherein each stream of data has its own stream data format;

determine a query associated both with a first one of the plurality of streams of data and one or more records of a database stored in a database format;

determine whether the one or more records are stored in a local cache, the local cache comprising one or more records that had been retrieved from the database and converted into the streaming data format of the first stream prior to the receiving;

retrieve, from the database, any records of the database associated with the query and not already stored in the local cache;

convert the retrieved records from the database format into the streaming data format, wherein the converting changes an internal representation of how the records retrieved from the database are stored in a local cache, wherein the converted records are stored in the local cache in the streaming data format, wherein the query is executed against both the first stream of data and the converted records from the database as stored in the cache; and provide a query response for an execution of the query, wherein the query response comprises references to the records of the database stored in the local cache in the streaming data format that are associated with the query;

wherein at least one of the receiving, determining a query, retrieving, converting, and providing are performed by one or more computers in parallel on both the first stream and a second one of the plurality of streams.

15. The system of claim 14, the at least one processor further configured to:

execute the query.

16. The system of claim 14, wherein to execute the converting the at least one processor is configured to:
   remove data type information from the retrieved records in the database format.

17. The system of claim 14, wherein to execute the determination of whether the one or more records of the data are stored in a local cache the at least one processor is configured to:
   execute the query against the database;
      determine that a particular record of the database associated with the query is stored in the local cache;
      determine whether a hash value of the particular record as stored in the local cache is different from a hash value for the particular record as determined based on data retrieved from the database based on the execution of the query; and
      remove the particular record from the local cache based on the determination of whether hash values are different.

18. The system of claim 14, the at least one processor further configured to:
   tracking how many queries are accessing a particular record of the local cache; and
   removing the particular record from the local cache if it is determined that the particular record is not being accessed by any queries.

19. The system of claim 14, wherein to execute the determination of whether the one or more records of the data are stored in a local cache the at least one processor is configured to:
   execute the query against the database;
   determine a database hash value for the records of the database associated with the query based on the execution;
   determine a local cache hash value for the one or more records of the local cache; and
   compare the local cache hash values to the database hash values, wherein the retrieving comprises retrieving database records for any database hash value that does not have a corresponding local cache hash value.

20. A tangible computer-readable device having instructions stored thereon that, when executed by at least one computing device, causes the at least one computing device to perform operations comprising:
   receiving a plurality of streams of data, wherein each stream of data has its own stream data format;
   determining a query associated both with a first one of the plurality of streams of data and one or more records of a database stored in a database format;
   determining whether the one or more records are stored in a local cache, the local cache comprising one or more records that had been retrieved from the database and converted into the streaming data format of the first stream prior to the receiving;
   retrieving, from the database, any records of the database associated with the query and not already stored in the local cache;
   converting the retrieved records from the database format into the streaming data format of the first stream, wherein the converting changes an internal representation of how the records retrieved from the database are stored in a local cache, wherein the converted records are stored in the local cache in the streaming data format, wherein the query is executed against both the first stream of data and the converted records from the database as stored in the cache; and
   providing a query response for an execution of the query, wherein the query response comprises references to the records of the database stored in the local cache in the streaming data format that are associated with the query, wherein at least one of the receiving, determining a query retrieving, converting, and providing are performed by one or more computers in parallel on both the first stream and a second one of the plurality of streams.

* * * * *